(No Model.)

A. M. HUNT.
COUPLING FOR ELECTRIC WIRES.

No. 451,933. Patented May 12, 1891.

WITNESSES:
Darwin S. Wolcott
F. E. Gaither

INVENTOR,
Andrew M. Hunt
by George N. Christy Att'y

UNITED STATES PATENT OFFICE.

ANDREW M. HUNT, OF NEWARK, NEW JERSEY.

COUPLING FOR ELECTRIC WIRES.

SPECIFICATION forming part of Letters Patent No. 451,933, dated May 12, 1891.

Application filed December 29, 1890. Serial No. 376,044. (No model.)

*To all whom it may concern:*

Be it known that I, ANDREW M. HUNT, a citizen of the United States, residing at Newark, in the county of Essex and State of New Jersey, have invented or discovered a certain new and useful Improvement in Couplings for Wires, of which improvement the following is a specification.

The invention described herein relates to certain improvements in couplings for uniting the ends of electric conductors.

It is essential in uniting the ends of conductors that the wires should have a clean and firm metallic contact with each other, and the contact-surface should be as large as circumstances will permit. Joints have heretofore been made from metal strips into the form of tubes adapted to receive the ends of the wires to be joined. The adjacent edges of each strip are soldered or brazed together, completing the tube, and the two tubes are arranged alongside of each other and soldered or brazed together. The ends of the wires to be joined are then inserted into the tubes—one in each tube—from opposite directions. The coupling with the contained wires is then twisted into spiral form, thus drawing the walls of the united tubes against their contained wires. These couplings are not only objectionable on account of the expense of manufacturing, but also, on account of the presence of a foreign metal introduced by the soldering or brazing, are liable to start local electrical action should moisture enter the joint; and, further, these tubes are so secured that the solder employed in their construction and uniting them together forms the electrical connection even when the connected tubes and their inclosed wires are twisted together, thereby introducing a comparatively poor conductor.

The object of this invention is to provide a coupling far less expensive to construct, more easily and quickly applied, and whereby the wires are drawn, and, in fact, rubbed in metallic contact with each other.

Figure 1:
Figure 3:
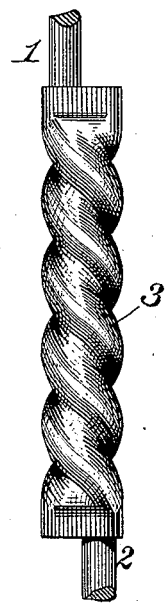
Figure 2:
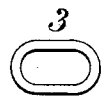
Figure 4:
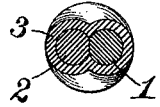

In the accompanying drawings, forming a part of this specification, Figure 1 is a view in side elevation of my improved coupling. Fig. 2 is an end view of the same. Fig. 3 is a view in elevation of a completed joint, and Fig. 4 is a transverse section of the joint.

In the practice of my invention the ends of the wires 1 and 2 to be joined are inserted from opposite directions into a short section of metallic tubing 3, preferably oblong in cross-section, as shown in Fig. 2. The longer internal diameter of the tube-section is made approximately equal to the combined diameters of the wires to be joined, so that said wires, when inserted in the tube, will be in contact with each other, or nearly so, while the shorter internal diameter of the tube is approximately equal to the diameter of the wires, so that the internal surface of the tube-section will be in contact with the surfaces of the inserted wires, or nearly so. After the insertion of the wires into the tube, as stated, the tube is grasped by suitable tools, so that both wires will be firmly held. The tools are then rotated in opposite directions, thereby twisting the tube and contained wires into a spiral, as shown in Fig. 3. In this twisting operation the wires, if not already in contact, are drawn tightly into contact by the contraction of the tube due to the twisting, and as the twisting of the wires together will cause them to move one over or around the other their contact-surfaces will be rubbed together, thereby producing a bright metallic contact of the surface atoms of one wire with those of the other. In addition to the perfect electrical contact thus produced between the wires themselves, the twisting operation will stretch the surrounding tube, causing its inner surface to rub against the surfaces of the wire, thus producing an atom-to-atom contact between the wires and the tube; and, further, as the twisting continues the tubing is drawn tighter against the wires and is caused to hug and conform closely thereto, as shown in Figs. 3 and 4.

It will be observed in a joint constructed as described that there is not only good electrical contact between the wires themselves, but also between the wires and the sleeve or tube 3, the latter having a large bearing-surface on the wires, and as the twisting rubs the wires and sleeves together into an almost homogeneous mass the electrical carrying capacity of the joint is nearly equal to the entire mass of metal at the joint.

The sleeve or tube can be employed for connecting wires of different diameters, as by sufficient twisting, the sleeve can be contracted sufficiently to bind against and conform to both wires. In order to prevent local electrical action, the tubes or sleeves should be made of the same metal as the wires to be joined.

I claim herein as my invention—

1. A coupling for electric wires, consisting of a metal sleeve having an internal diameter not less than the combined diameters of the wires to be joined and adapted by twisting to bind the inclosed wires together and conform to the external surfaces of the wires, substantially as set forth.

2. A coupling for electric wires, consisting of a metal sleeve oblong in cross-section, the longer diameter thereof being not less than the combined diameters of the wires to be joined and adapted by twisting to bind the inclosed wires together and conform to the external surfaces of the wires, substantially as set forth.

3. A joint for electric wires, consisting of a sleeve inclosing the ends of the wires to be joined, the sleeve and inclosed wires being twisted into spiral form, whereby the wires are bound tightly together in metallic contact with each other and the sleeve caused to conform to the external surfaces of the twisted wires, substantially as set forth.

In testimony whereof I have hereunto set my hand.

ANDREW M. HUNT.

Witnesses:
JAMES M. HUNT,
PHILIP M. HUNT.